Fig. I

INVENTORS
Arnold I. Klayman,
and Leonard J. Genest

── # United States Patent Office 3,461,371
Patented Aug. 12, 1969

3,461,371
MANUALLY OPERATED MOTOR SPEED CONTROL SYSTEMS WITH AUTOMATIC POWER ASSIST BY SEMICONDUCTOR CONTROLLED RECTIFIERS
Arnold I. Klayman and Leonard J. Genest, Marina Del Rey, Calif., assignors to The Singer Company, New York, N.Y., a corporation of New Jersey
Filed Dec. 27, 1966, Ser. No. 604,708
Int. Cl. H02p 5/00, 7/00; H02k 27/20
U.S. Cl. 318—332                                   5 Claims

ABSTRACT OF THE DISCLOSURE

A circuit configuration is disclosed wherein a direct current motor is supplied from an unfiltered full-wave rectified alternating voltage source by an operator-actuated variable resistor and a current-sensing resistor in series therewith. A solid state controlled rectifier is connected with its anode-cathode circuit in shunt with the series-connected variable resistor and current-sensing resistor. The current-sensing resistor is connected to the gate and cathode of the controlled rectifier to furnish the sole firing signal thereto responsively to increased load on the motor. A free-wheeling diode is connected in shunt with the motor to insure turn-off of the controlled rectifier at the end of each half cycle of said rectified voltage.

---

Figure 1:
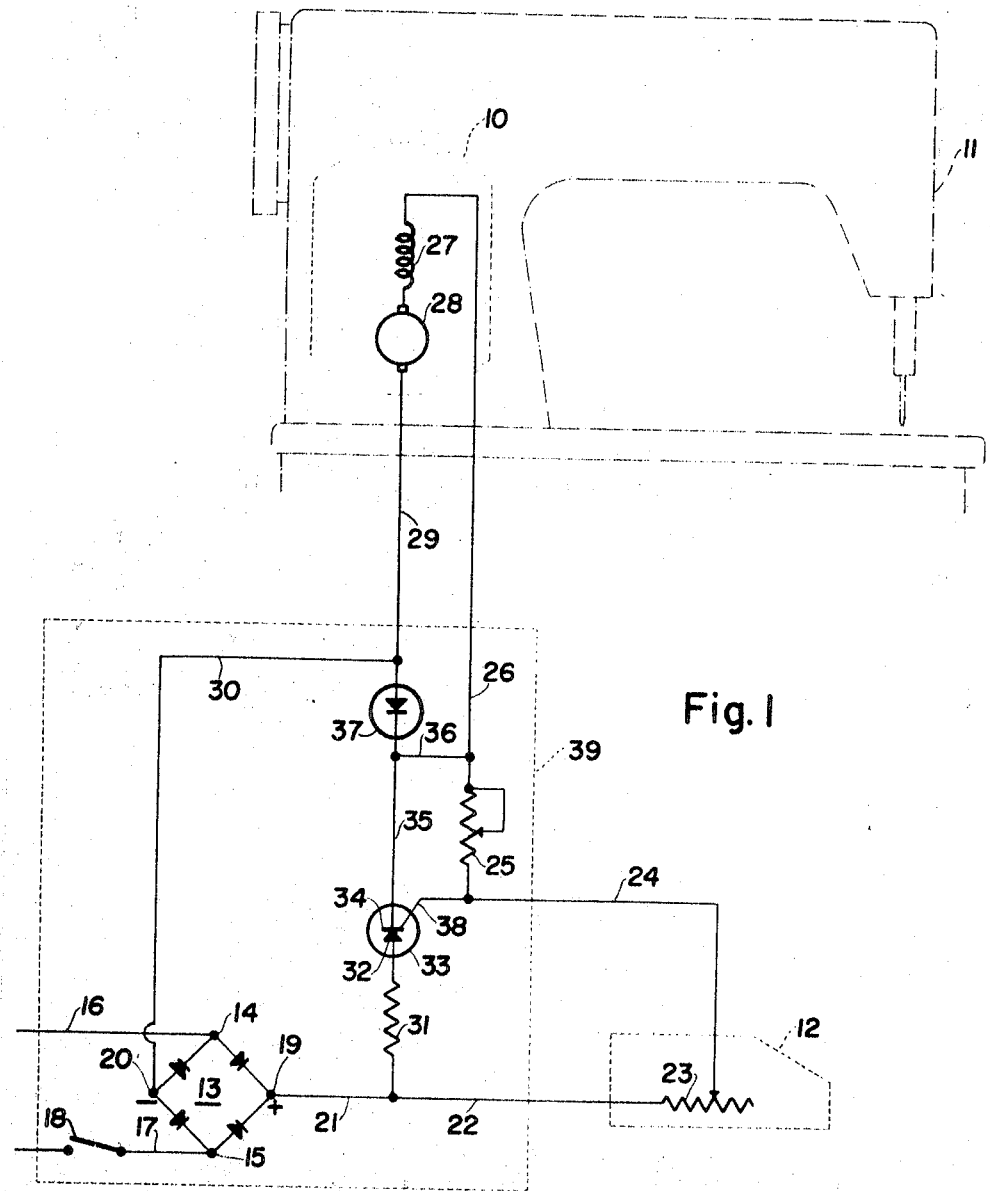

The present invention relates to motor speed control systems and more especially relates to improvements in speed control systems for direct current motors having a manually-adjustable resistance in series with the motor and with the supply voltage source for controlling the motor speed.

The improvement according to this invention provides a second current path to the motor shunted around the manually-adjustable resistance and this path is made effective responsively to the firing of a silicon controlled rectifier (SCR), which firing is made responsive to changes in the motor load. The SCR thus operates in the nature of an automatic power assist to the motor and its ability to respond rapidly on a per cycle basis permits the motor to meet substantially instantaneous load torque demands without altering its speed appreciably. This speed regulation could not be accomplished by the manually-adjustable resistance alone because the human feedback response is too slow to meet the rapidly changing torque demand.

In the prior art of motor speed control by SCR firing responsively to motor speed error signals, it has been customary to use the SCR as the sole means for obtaining power current flow to the motor. Due to the fast turn-on characteristic of the SCR, this results in current pulse trains through the motor having high ratios of peak to average value. While this has the advantage of producing high driving torque impulses which are important, for example, in a drive for sewing machines in producing good needle penetration, it also has the disadvantage of producing impulse noise in the driven machine which is disagreeable in a home environment.

The system of the present invention, therefore, represents an ideal compromise in which the steady or slowly changing torque demand is supplied by the operator controlling the manually-actuated resistance and the instantaneous increased torque demand is automatically supplied by the SCR. This provides a motor current having a lower ratio of peak to average value than obtainable by systems which depend on the firing of the SCR alone for speed control and results in adequate torque production with an acceptably low noise level.

A further advantage of the use in this invention of the SCR as a power assist device resides in the fact that, should the SCR fail to fire, the system is still operative to provide speed control but, of course, with reduced performance.

It is therefore a primary object of this invention to provide a motor speed control system which shall combine direct manual control of current to the motor by one path with automatic load responsive control of current to the motor by a second path in shunt with said first path said second path being furnished by the periodic firing of a controlled rectifier.

It is a further object of this invention to provide a motor speed control system especially suited for driving sewing machines, sabre saws and similar devices having periodically changing torque demand in that it utilizes an ordinary foot or trigger controller in the usual manner but combines therewith the ability to supply the instantaneous high torque demand particularly at low speeds without stalling.

It is a still further object of this invention to provide a motor speed control system in which steady or slowly-varying current is supplied continuously to the motor to meet its slowly varying low torque demands and periodic pulses of current are automatically additionally supplied to the motor by a controlled rectifier to meet the suddenly increased torque demands of the load such, for example, as created by needle penetrations during the sewing cycle of sewing machines.

It is a further object of this invention to provide a motor speed control system in which the current supplied to the motor has a lower ratio of peak to average value for the same periodic torque demand than systems which depend entirely on the firing of the SCR for supplying the motor current.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby will be readily understood by those skilled in the art.

FIGURE 1 of the drawing illustrates in diagrammatic form an embodiment of this invention as applied to a series commutator motor for driving a sewing machine.

Figure 2:
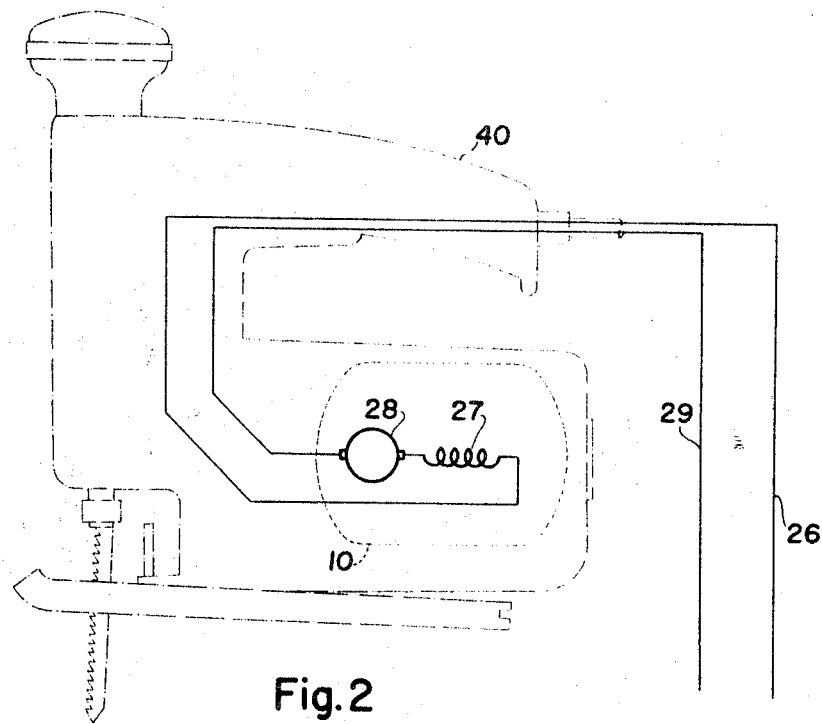

FIGURE 2 illustrates an embodiment of this invention as applied to a series commutator motor for driving a sabre saw. It is to be understood that the embodiments shown are not to be construed as limiting this invention to any specific application but are only illustrative of important applications of the invention which demonstrate its special advantages as will be described presently.

Referring now to FIGURE 1, the circuit of this invention is shown applied to the control of the speed of an electric motor 10 driving a sewing machine 11 by variation of the resistance of a foot-controller 12.

A conventional bridge-type full-wave rectifier 13 has input terminals 14 and 15 connected through leads 16 and 17 respectively to a source of A.C. voltage (not shown). A switch 18 may be used for selective isolation from the source voltage.

Current is supplied to the motor 10 from the positive and negative output terminals 19 and 20, respectively, of the full-wave rectifier 13 to the motor 10 by two series circuits. The first circuit may be traced from the positive output terminal 19 through leads 21 and 22 to variable resistor 23 of the foot-controller 12 through lead 24 to a current-sensing resistor 25 through lead 26 to the series-connected field winding 27 and armature winding 28 of motor 10 and through leads 29 and 30 to the negative output terminal 20. This circuit, except for the addition of the current-sensing resistor 25, is a conventional series resistance control circuit ordinarily used for speed control of sewing machines.

A second series circuit may be traced from the positive terminal 19 through lead 21 through current-limiting resistor 31 to the anode 32 of a silicon controlled rectifier 33, from the cathode 34 through leads 35, 36 and 26 to the series connected field winding 27 and armature winding 28, through leads 29 and 30 to the negative output terminal 20.

A free-wheeling diode 37 is connected in shunt with the series-connected armature and field windings 28, 27 for a purpose which will be explained presently. The current-sensing resistor 25 is connected between the gate control elements 38 and the cathode 34 of the SCR 33.

It will be noted that the motor 10 as described above has series-connected field and armature windings 27 and 28 and illustrates but one type of D.C. motor that maybe used in the circuit of this invention. It will be understood by those skilled in this art that other types of D.C. motors, such as shunt field motors and permanent magnet field motors, may also be used in the circuit of this invention.

If the SCR 33 where omitted from the circuit of this invention it would revert to the conventional series resistance type control which presents poor control at low speeds due to the poor speed regulation caused by the voltage drop in the operator-actuated controller resistance 23. Any attempts by the operator to prevent stalling by a suddenly applied load or a runaway by a suddenly released load are ineffective with series resistance control because the human reaction time is too slow to meet the fast changing load demand by mere manipulation of the controller.

It is therefore a fundamental concept of this invention to supply power current to the motor by a low resistance path supplemental to that through the foot-controller resistance and to make this path effective instantly in response to increased load on the motor.

Operation

In the circuit of this invention a small-valued current-sensing resistor 25 is placed in series with the controller resistor 23 and the motor 10. For any unloaded speed setting of the controller 12, due to the fact that the current through the motor is approximately constant, the voltage drop across resistor 25 is also constant. This voltage as will be seen is the gate-to-cathode voltage of the SCR 33 and will control the firing thereof. The value of resistor 25 is adjusted so that, at some predetermined light load, the rectifier 33 will just fail to fire.

If the load on the motor is now increased above the predetermined value, the motor draws increased current which increases the voltage drop across the resistor 25 and causes the rectifier 33 to conduct and instantly to provide current flow to the motor limited essentially only by the series resistor 31 which may be adjusted to any suitable value. The fact that the SCR can turn on in a few microseconds after the gate voltage reaches the firing value in each half cycle of the rectified voltage provides the fast response necessary to supply additional torque to keep the motor from stalling.

The operation of the type of controlled rectifier (SCR) used in the illustrated exemplification is more fully described in Chapter 1 of the General Electric Controlled Rectifier Manual, First Edition, 1960.

Furthermore, in this circuit the rectifier 33 is turned off at the end of each half cycle substantially when the voltage at terminals 19 and 20 goes to zero value because the anode-cathode current falls below the holding current value and the gate can regain control as is a well-known property of controlled rectifiers of the type indicated. This turn-off of the rectifier 33 at zero voltage is assured by the use of the free-wheeling diode 37 which functions to provide a local circulating path for the reactive current of the inductive load of the motor and thus to prevent it from maintaining holding current through the anode-cathode circuit of the SCR 33. Thus the current-sensing resistor 25, in effect, samples the motor current each half cycle i.e. 120 times each second for a 60 cycle supply voltage, and either fires the rectifier or holds it in a blocking state for each sample in accordance with the load demand as sensed by the resistor 25.

It will be understood that the sole function of the sensing-resistor 25 is to supply the small firing signal to the gate-cathode 38, 34 of the SCR 33. Accordingly, the resistor 25 may have a very low ohmic value, being of the order of one or two ohms for the embodiment shown for driving a sewing machine motor. This value is so small that it does not appreciably affect the top speed of the motor attainable with the controller resistor 23 reduced to zero.

The current limiting resistor 31 may be adjusted to limit the peak current supplied by the SCR and is selected to satisfy the power requirements and still maintain a smooth power control.

While the firing of the SCR in the circuit of this invention is essentially an on-off type of control, there is also some phase control and higher load currents in the sensing resistor 25 will cause firing of the SCR proportionately earlier in the half cycle. In any case, the sampling frequency is so high that the result is a close modulation of the power current to the motor to meet its load demands.

That portion of the circuit which supplies the automatic power assist function is shown within the dotted rectangle 39 only for purpose of emphasizing the dual function of this circuit as a whole.

FIGURE 2 illustrates the application of this invention to a sabre saw 40 powered by the motor 10 having series-connected field winding 27 and armature winding 28 connected by leads 26 and 29 to the circuit of FIGURE 1. The sabre saw 40 presents a load on motor 10 which has a periodically and rapidly changing torque demand due to loading on the upward stroke and unloading on the downward stroke of the saw blade. This type of load can also with advantage be supplied by the motor 10 when controlled by the circuit of this invention because of the fast and automatic response of the controlled rectifier to changing load conditions as sensed by the current-sensing resistor 25 as described above in connection with FIGURE 1.

The above described circuit embodies the invention wherein a direct current motor is supplied from an unfiltered full-wave rectified alternating voltage source by an operator-actuated resistor-controlled current path and by a supplemental current path automatically controlled by periodic sampling of the motor current during each half cycle of the source voltage. By utilizing a simple current-sensing resistor as the sole means for producing the gate control voltage for a solid state controlled rectifier which controls the supplemental path, the invention permits the motor to quickly meet the instantaneous torque demands of the load without stalling or runaway.

Modifications may be made both in the circuit arrangement and in the instrumentalities employed and it is contemplated in the appended claims to cover any such modifications which fall within the true spirit and scope of the claims.

Having thus described the nature of this invention, what we claim herein is:

1. A motor speed control system for use with a device having a series commutator electric driving motor said motor speed control system having a first current path means including a manually-actuated variable resistance element electrically connected in series with the motor to control the current to the motor and a second normally non-conducting current path means in shunt with said first current path means including a silicon controlled rectifier for effecting automatic load-responsive control of current to the motor, said second current path being made effective to conductively shunt the first current path by the periodic firing of the silicon controlled rectifier.

2. A circuit for controlling a direct current motor from an alternating current source comprising: rectifying means supplied by said alternating current source and delivering a rectified voltage having periodically a zero magnitude, means including a manually-actuated variable resistor and a series-connected current-sensing resistor connecting said motor to said rectified voltage, a solid state controlled rectifier connected to provide a normally non-conducting path around said variable resistor and current-sensing resistor, means selectively operative following the increase of said rectified voltage above said zero magnitude to render the controlled rectifier conductive in accordance with the current flow in said current-sensing resistor, and a free-wheeling diode connected in shunt with the motor for rendering the controlled rectifier non-conductive when said rectified voltage has substantially zero magnitude.

3. A circuit as defined in claim 2 wherein a resistor connected in series with the controlled rectifier limits the peak current supplied to the motor by the controlled rectifier.

4. A circuit for controlling a direct current motor from an alternating current source comprising: a full-wave rectifier supplied by said alternating current source and delivering an unfiltered rectified voltage, operator-influenced means connected between said full-wave rectifier and said motor providing a variable resistance path for the flow of current to said motor, a current-sensing resistor series-connected in said path, a solid state controlled rectifier having a control element and connected to provide a normally non-conducting path in shunt with said variable resistance path, means connecting the current-sensing resistor to the control element to render the controlled rectifier conducting in accordance with the current in said current-sensing resistor to provide periodically a supplemental path for current flow to the motor, and a free-wheeling diode connected in shunt with the motor to render the controlled rectifier periodically non-conductive.

5. A circuit for controlling a direct current electric motor comprising: a full wave rectifier having input terminals for connection to an alternating current source and output terminals providing a full-wave unidirectional voltage, means including a manually-actuated variable resistor and a current-sensing resistor connected in series with said output terminals and the electric motor for directly controlling the current to the motor, a solid state controlled rectifier having an anode a cathode and a gate element, said controlled rectifier having its anode and cathode connected in a series circuit with a current limiting resistor, said series circuit connected in a shunt path around the series-connected variable resistor and current-sensing resistor, means connecting the current-sensing resistor in shunt with the gate and cathode of the controlled rectifier, and a free-wheeling diode connected in shunt with said direct current electric motor.

References Cited

UNITED STATES PATENTS

| | | | |
|---|---|---|---|
| 3,177,418 | 4/1965 | Meng | 318—434 |
| 3,222,583 | 12/1965 | Gatzwiller | 318—331 |

ORIS RADER, Primary Examiner

ALFRED G. COLLINS, Assistant Examiner

U.S. Cl. X.R.

318—345